United States Patent [19]

Lebbar et al.

[11] Patent Number: 4,780,534

[45] Date of Patent: Oct. 25, 1988

[54] PROCESS FOR PRODUCING AGAR-AGAR FROM AN ALGAE EXTRACTION JUICE

[75] Inventors: Rachid Lebbar, Kenitra, Morocco; Michel Delmas, Auzeville-Tolosane; Antoine Gaset, Toulouse, both of France

[73] Assignee: Institut National Polytechnique, Toulouse, France

[21] Appl. No.: 889,092

[22] Filed: Jul. 7, 1986

[30] Foreign Application Priority Data

Jul. 5, 1985 [FR] France .................. 85 10687

[51] Int. Cl.$^4$ ............................................. C08B 37/04
[52] U.S. Cl. ....................................................... 536/3
[58] Field of Search ............................................ 536/3

[56] References Cited

U.S. PATENT DOCUMENTS

| | | | |
|---|---|---|---|
| 1,399,359 | 12/1921 | Matsuoka | 536/3 |
| 2,439,964 | 7/1944 | Byrne et al. | 536/3 |
| 3,856,569 | 12/1974 | Strong | 536/3 |
| 4,178,439 | 12/1979 | Ayers et al. | 536/3 |

Primary Examiner—Joseph L. Schofer
Assistant Examiner—Alex H. Walker
Attorney, Agent, or Firm—Harold H. Dutton, Jr.

[57] ABSTRACT

A process for making agar-agar from algae extraction juices and comprising: (a) placing the extraction juice in the presence of a cationic ion exchange resin conditioned into the $Na^+$ form, then placing it (b) in the presence of an anion exchange resin conditioned into the $Cl^-$ and/or $SO^{--}_4$ form, then (c) optionally placing the juice in the presence of a cation ion exchange resin conditioned into the $OH^-$ form, (d) thereupon gelling the juice, (e) extracting the agar-agar from the obtained gel, and where called for (f) treating the obtained powder by placing it in contact with an ozone-loaded carrier gas. Such a process allows producing at reduced costs high-grade agar-agar, useful in particular in the medical, pharmaceutical and bioengineering fields.

14 Claims, 1 Drawing Sheet

PROCESS FOR PRODUCING AGAR-AGAR FROM AN ALGAE EXTRACTION JUICE

The invention concerns a process for producing agar-agar from an algae extraction juice, in particular from red algae (gelidium, gracilaria, pterocladia . . . ). In particular its object is the manufacture of high-purity agar-agar lending itself to applications in the medical, pharmaceutical fields or in biotechnology.

BACKGROUND AND OBJECTS OF THE INVENTION

Agar-agar is a mixture of polysaccharides (agarose, agaropectin) of high molecular weight between 40,000 and 300,000. It is made generally by producing algae extraction juices by autoclaving and by treating the juices containing about 2% of agar-agar in order to extract the agar-agar.

Presently there are two main treatment types for the agar-agar juices and these are applied depending on the product quality which is desired, and in particular the chemical purity and bacterial contamination. To obtain a present day commonplace quality product which may be utilized in particular in the agrofoodstuff business, this treatment comprises adding sodium hypochlorite or sodium chlorite to the extraction juice in concentration of about 1% by weight, and then providing directly either a mechanical pressing of the gelled juice, or a congealing/decongealing of the gelled juice, so as to obtain an agar-agar cake which will be subsequently dried. However this product is slightly colored and contains minerals, so that it is unsuitable in fields demanding higher quality (medicine, pharmaceutics, biotechnology). However, this method does offer the advantage of economy.

To make a higher quality agar-agar product, the main treatment employed presently comprises adding chemical additives to the extraction juice, whereby it is possible both to remove the color from the juice and to precipitate the heavy cations $Ca^{++}$, $Fe^{+++}$, $Mg^{++}$ etc. which are present in the extraction juice, and then to congealing/decongealing the extraction juice at low temperature ($-20°$ C.) so as to precipitate agar-agar of high quality. As a rule this operation is repeated to provide constant quality. However this process is exceedingly costly due to the energy required and this accounts for the present agar-agar prices, where for the high grade type the costs are about double those of the ordinary quality agar-agar.

Furthermore, in certain applications in science, analysis and biochemistry, the slight presence of sulfate in the agaropectin fraction of agar-agar presents a problem and presently it is eliminated by precipitating the agaropectin by means of complexing agents (ethylene glycol, cetylpyridinium chloride, etc.). However these complexing agents too are costly and cause the loss of the entire agaropectin fraction which amounts to 10 to 50% by weight of the entirety.

It has already been suggested in another technical field to treat agaroid solutions (strongly sulfated polygalactan close to the carrageenan family) be means of ion exchange resins: "Chemical Abstracts," vol. 74, Apr. 19, 1971 #16, page 71, abstract No. 77,673, D. T. Ionescu, et al, "Decolorization of Agaroid Solutions by using Macroporous Anion Exchanger." This treatment places the agaroid solution in the presence of a cationic resin conditioned into ammonium form which in turn is placed in the presence of an anion resin, lastly by ending the decoloration on activated carbon. However this process is inapplicable to extracting high-grade agar-agar because the ammonium ion required to treat the agaroid (in view of the subsequent recovery procedure of the product by alcohol precipitation requiring the presence of an ammonium salt soluble in the hydro-organic phase) amounts to incompatible contamination pollution in the light of the quality sought for the agar-agar. The skilled artisan is well aware of this incompatibility, and this may explain why the two techniques have not been merged, the more so that the above cited article goes back to 1971.

Also, the decoloration quality of the agaroids is mediocre and is implemented on activated carbon, whih, for agar-agar removes any economic significance from such a process. Furthermore, in spite of a resemblance in terminology, agaroid has a very polar chemical structure (many sulfate groups are present), which differs strongly from the chemical structure of agar-agar: agaroid relates to the treatment techniques for the strongly sulfated phycocolloids, whereas agar-agar relates to the treatment techniques for weakly sulfated or neutral polysaccharides, and there is no relationship between the said techniques. Applying the process from one field to another or priori is not contemplated by the expert. Also, as a rule agaroid is precipitated in the final phase by an alcohol providing bacteriological decontamination, however this operation is very costly and in the case of agar-agar would render the obtained product more expensive than the high-grade products obtained by congealing/decongealing.

The object of the present invention is to provide a novel method for making agar-agar from algae extraction juices whereby it is possible to produce high-grade agar-agar compatible with applications in the medical, pharmaceutical and bioengineering fields.

One object of the invention is to keep production costs near those presently entailed by the production of commonplace quality agar-agar.

Another object is to produce desulfated agar-agar without losing a fraction of the agar-agar and without significant increases in costs.

A further object is to facilitate the recovery of the coloring by-products contained in the extraction juices for possible economic applications.

DESCRIPTION OF THE INVENTION

To those ends, the production process for agar-agar of the invention comprises in combining in the order stated below the following operations:

(a) an algae extraction juice containing agar-agar is contacted with a cationic ion exchange resin conditioned in the $Na^+$ form at a temperature exceeding the gelling threshold of the juice;

(b) the extraction juice is contacted with an anionic ion exchange resin conditioned in the $Cl^-$ and/or $SO_4$ form at a temperature exceeding the gelling threshold of the juice;

(d) the juice temperature is lowered below the gelling threshold; and then (e) the agar-agar is extracted from the obtained gel.

Experiment has shown that such a process high-grade agar-agar comparable to that provided by the congealing/decongealing method discussed above.

In the course of the operation (a), the heavy cations retained on the agar-agar molecule (in particular the $Ca^{++}$ cation) are exchanged by the $Na^+$ cation from the cation resin. Tests have shown that this exchange affects nearly all of the heavy cations retained by the agar-agar (the proportion of residual heavy cations possibly being as low as 10 ppm). The heavy cations retained by the anion sites of the agar-agar are therefore selectively fixed by the anion sites of the resin and are replaced by the $Na^+$ cations of this resin. A priori it is surprising that an ion exchange resin of the above type should allow such an exchange and even more so a proportion where nothing implies a highly selective exchange for these two types of polymers (resin, agar-agar), and at present this exchange is hard to explain. The unexpected character of this phenomenon is intensified because it takes place without the addition of mineral charges, especially of sodium carbonate (such addition of charges would be incompatible with obtaining high-grade agar-agar). Moreover, no saturation at all of the resin pores was observed, nor any degradation of the agar-agar molecule (in view of the size of the agar-agar molecule, these are remarkable results).

In the course of the operation (b), the coloring agents from the algae and which represent a significant depreciation factor of the agar-agar are fixed onto the resin essentially by anion exchange with salting-out of the $Cl^-$ or $SO_4^{--}$ ions in the juice. This fixation is remarkably and unexpectedly effective, arising from the fixation mode on the ion site permitted by the nature of the juice colorants (pyrrole derivatives, Maillard-reaction products, etc.)

It should be noted that by demineralizing (a) before decoloring (b), precipitation of calcium phosphate into the pores of the a ion resin, is averted, which otherwise would cause the danger of site inactivation during the decoloration (b).

Accordingly the gel obtained at the end of the cooling (d) contains agar-agar molecules free of the colorants and of the heavy cations (the anion sites of the molecules bearing the $Na^+$ counter-ion providing electrical neutrality) and an aqueous phase free of the colorants and heavy cations, which is loaded with NaCl and/or $Na_2SO_4$ substantially formed from the ions that entered the solution at the end of the operations (a) and (b) due to the combined selections of the conditioning of the resins used.

The purpose of the extraction (e) is to eliminate most of the aqueous phase and its mineral NaCl charge, and it allows making a neutral agar-agar cake meeting the so-called bacteriological quality standards. The $Na^+$ counter-ion retained by the agar-agar molecules is an integral part of the agar-agar molecule and provides this molecule with its bacteriological properties, as apposed to the heavy cations which introduce hardness that degrades product quality.

The process of the invention furthermore allows easily recovering in their native forms the colorants fixed on the anion resin when the resin is being regenerated. This recovery is possible by the ion-exchange fixation mode and can take place in a known manner by treating the anion resin with a hydrochloric acid solution followed by washing with water and percolation by means of an organic solvent such as ethanol, acetone etc.

The process of the invention moreover allows producing a desulfatized agar-agar at minimal cost compared to the existing procedures. It suffices to carry out a complementary operation in between the above steps (b) and (d), whereby the extraction juice obtained from (b) is placed in the presence of an anion ion-exchange resin conditioned in $OH^-$ form and at a temperature exceeding the gelling threshold of said juice.

Accordingly, contrary to the existing procedures, this desulfatization is carried out in the absence of a third body (soda or complexing agent). The $C_6$ sulfate groups are eliminated on the resin sites and following this reaction, an anhydrogalactose bridge is formed with the $C_3$ carbon. Thus the agar-agar chain of the agaropectin fraction remains in the juice and will not be lost.

As regards this intermediate, optional step (c), the temperature of the extraction juice is kept between 50° and 60° C. in order to prevent premature juice gelling and resin degradation.

Furthermore, with regard to another significant feature of the invention, in a subsequent operation (f), the agar-agar in the form of a powder extract is in contact in a gas/solid phase with an ozone-loaded carrier gas. Preferably the carrier gas contains from 2 to 20 mg of ozone per liter of carrier gas.

In this manner remarkable bacterial decontamination is achieved without being forced to add a chemical agent in solution. Surprisingly the ozone destroys the microorganisms without at all degrading the agar-agar molecule. The agar-agar gelling strength or gelling potential *(which characterizes its quality) suffers no change following the ozone treatment.

Moreover, in a preferred embodiment, the temperature of the extraction juice is kept between 60° and 80° C. during the operations (a) and (b), operation (d) having as its purpose the cooling of the juice down to the ambient temperature. In the most common cause of an algae extraction juice obtained by autoclaving, this juice is treated at the autoclave discharge temperature (near 95° C.) and maintaining this temperature requires only little energy.

Preferably the operations (a), (b) and the intermediate step (c) carried out in a fixed bed by causing the extraction juice to percolate through thermostatted resin columns, employing known methods.

Optimized results are obtained on one hand by employing in the operation (a) a cation resin functionalized by sulfonic groups and on the other by using in the operation (b) or (c) an anion resin functionalized by quaternary ammonium groups.

The skeleton of these resins in particular may be of the polystyrene or acrylic type.

In a preferred mode of implementation, whereby the production cost is minimized, the extraction (e) may amount to pressing the gel through a filter so as to keep an agar-agar cake; This pressing may be carried out conventionally in particular through a tight-cloth filter at a pressure between 300 and 600 bars.

Again, the extraction (e) may be carried out in a known manner by congealing/decongealing the gel so as to precipitate the agar-agar. This operation can be carried out conventionally by immersing buckets containing the agar-agar gel in brine-filled pans subsequently cooled to $-20°$ C. This implementation is applicable in those countries where electricity is very cheap. It should be noted that this operation does not require repetition to obtain a very high-grade agar-agar, so that the cost of this process is much reduced even for this implementation mode over the conventional method for making biological grade agar-agar.

DESCRIPTION OF THE DRAWING

The description below relates to the single drawing showing the schematic of a plant for implementing the process of the invention, and to illustrative implementations carried out in this plant:

DESCRIPTION OF THE PREFERRED EMBODIMENTS

Figure 1:
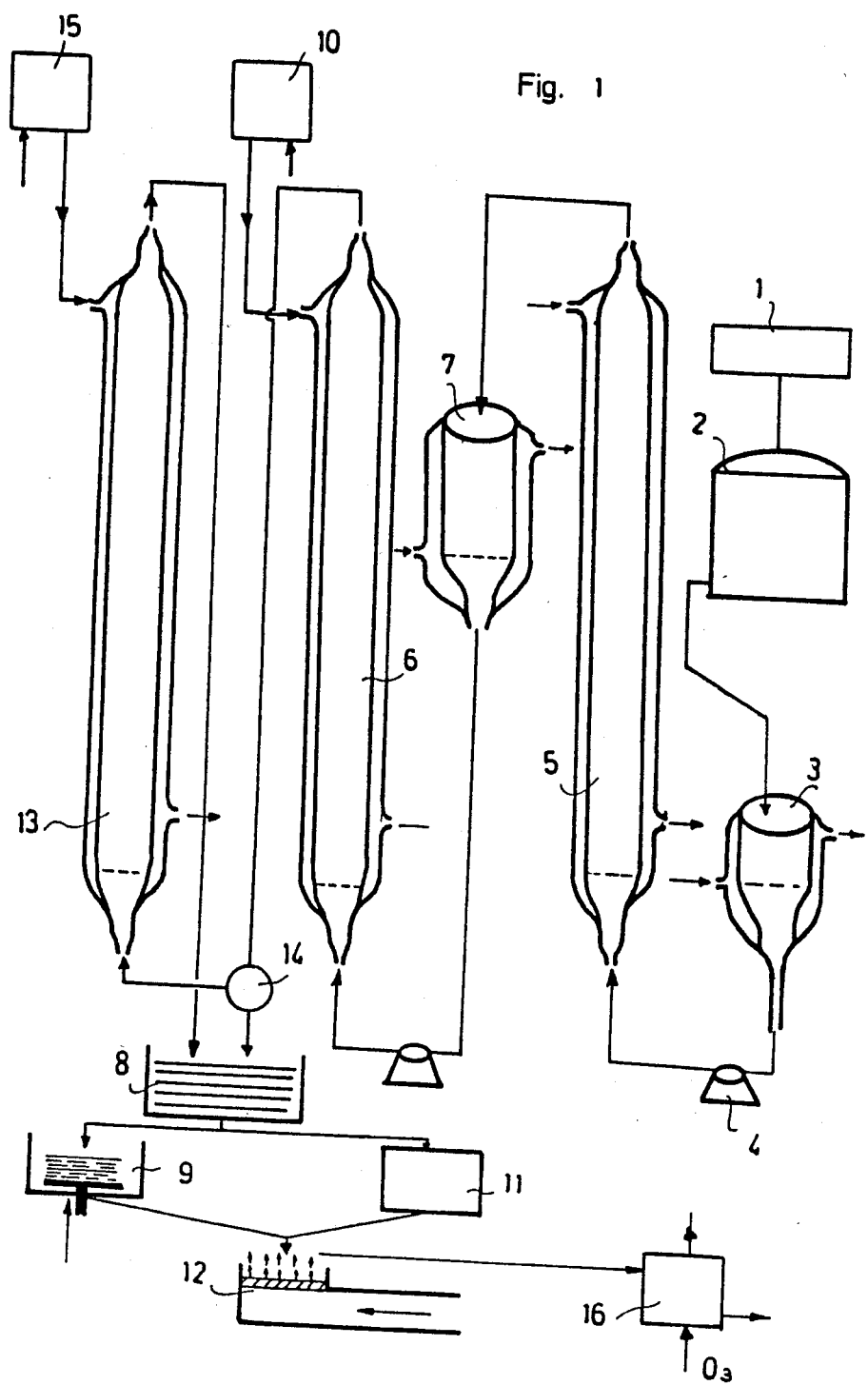

The following examples were implemented by using the general experimental procedure described below: 1 kg of dry algae is washed with water, then soaked in a circulating water basin 1 for 12 hours. Next the algae are extracted by means of 15 liters of water in an autoclave 2 at a pressure of 1.8 bars and at a temperature of 120° C. for 4 hours. The collected juice is filtered through a thermostatted filter 3 at 80° C. with a porosity of 0.0. Circulation is provided by a set of pumps such as 4. Next the juice is percolated upwards through two thermostatted columns 5 and 6 kept at an adjustable temperature between 60° and 80° C. and 30 mm in diameter and 1,000 mm high. The first column contains 0.7 liters of cation resin conditioned into $Na^+$ form and the second column contains the same volume of an anion resin conditioned into $Cl^-$ or $SO^{--}_4$ form. A flow regulator 7 is in line between the two columns and a temperature control stage 10 keeps the system at constant temperature.

A third column 13 similar to the first two is in series with these by means of a valve 14 whereby the juice can be supplied either through the column 13, or by directly discharging into a gelling tub 8. The column 13 is thermostatted similarly to the first two by a control stage 15 and is kept between a temperature from 50° to 60° C. After passing through this column 13, the juice is discharged into the tub 8. This column 13 contains 0.7 liters of anion resin conditioned into the $OH^-$ form.

After passing through the resin columns, the juice is gelled in the tub 8 at ambient temperature for 8 hours. The obtained gel is subjected either to mechanical compression in a vertical press 9 generating a pressure between 300 and 600 bars for 8 hours, or to congealing at $-20°$ C. for 48 hours followed by de-congealing at ambient temperature in a basin 11. These two procedures permit eliminating of 70 to 80% of the initially contained water. The dehydrated agar-agar cake is dried in a hot-air flow at 70° C. in an enclosure 12 until constant weight is obtained.

The extracted powder then is moved into an agitated reactor 16 receiving an air flow loaded with ozone at a concentration of 5 mg of ozone per liter of air. Fluidized-bed operation is possible.

The following analyses are performed at various stages in the process:
 optical-density measurements at 340 nm in a 1 cm/cell thermostatted at 80° C. (this test is carried out directly on the extraction juice and on 1.5% agar-agar solutions where agar-agar powder is concerned);
 dosing the chlorites by $AgNO_3$ titrimetry;
 calcium dosing by atomic adsorption spectroscopy;
 measuring the gelling with a NIKAN apparatus (on gels aged for 12 h and prepared from 500 ml of 1.5% solution where agar-agar powder is concerned and directly on 500 ml samples for extraction juices);
 iron dosing by phenanthroline colorimetry for $Fe^{++}$ and by the thiocyanates for $Fe^{3+}$;
 the traces of the heavy metals are displayed by the EDAX analysis (which also allows listing all the elements present in the agar-agar powder; this analysis is performed on the ashes of the agar-agar powder);
 dosing the D-galactose by the anthrone colorimetric method and dosing the anhydro-3,6-galactose by the resorcinol colorimetric method;
 dosing the residual nitrogen by ultimate analysis;
 quantifying the total germs to measure the bacterial contamination.

EXAMPLE 1

1 kg of red algae Gelidium Sesquipedale undergoes the above described extraction without passing into the column 13. The steaming is carried out with tap water containing 1.5 meq/l of $Cl^-$ (milliequivalent per liter), 2.5 meq/l of $Ca^{++}$ and 3 meq/l of $SO_4^{--}$. The collected juice has an optical density of 4.5 at 340 nm and a mineral content of 2 meq/l of $Cl^-$, 8 meq/l of $Ca^{++}$ and 5.2 p meq/l of $SO_4^{--}$. Its gelling strength is 910 g/cm².

The first column contains a cation resin of the "AMBERLITE 120" type with a polystyrene skeleton of which the functional group is a sulfonic group and the $Na^+$ cation is the counter-cation.

The second column contains a macroporous anion resin "DUOLITE A172" with an acrylic skeleton and of which the functional group is a quaternary ammonium and where the $Cl^-$ anion is the counter-anion.

Both columns are thermostatted at 80° C.

Passing the juice through the first cation column at a rate of 3.1 volumes of juice/resin-volume/hour results in a juice with an optical density of 4.2 at 340 nm and a mineral content of 2 meq/l of $Cl^-$, substantially zero for $Ca^{++}$ and 5.2 meq/l for $SO_4^{--}$; its gelling strength is 900 g/cm².

Passing the extraction juice through the second column at a rate of 6 volumes of juice per resin volume per hour results in a decolored juice with an optical density of 0.6 at 340 nm and a mineral content of 12 meq/l of $Cl^-$, 0 meq/l of $Ca^{++}$ and 0.2 meq/l of $SO_4^{--}$; its gelling strength is 900 g/cm².

The recovered juice is pressed, then dried. Its agar-agar yield is 21% with respect to the initial dry alga. This powder contains 0.7% of $Cl^-$, 0.74% of $Na^+$, 2.5% of $SO_4$ and 40 ppm of $Ca^{++}$. The EDAX analysis shows the presence of traces of Si, but not traces of Fe, Mg, Pb, K, P, Al or Zn. The total ash amounts to 3.5% of the initial weight. The galactose percentage is 48 and that of anhydro-3,6-galactose is 43.

The gelling strength of the agar-agar produced at the end of the chain at a concentration of 1.5% is 850 g/cm². Its optical density is 0.5 at 340 nm. Its nitrogen concentration is 0.1%. The gelling strength does not change upstream or downstream of the ozone treatment. This treatment reduces the number of total germs per gram of agar-agar from 6,000 to 450.

EXAMPLE 2

1 kg of red algae Gelidium Sesquipdale is subjected to the extraction described below. The collected juice has an optical density of 4.1 at 340 nm, a pH of 7.3 and a mineral content of 2.2 meq/l of $Ca^{++}$ and 6.4 meq/l of $SO_4^{--}$. Its gelling strength is 870 g/cm².

The first column (5) contains a macroporous cation resin AMBERLITE IR 200 with a polystyrene skeleton and of which the functional group is a sulfonic group and the Na+ cation is the counter-cation.

The second column (6) contains a macroporous anion resin DUOLITE A 171 with a polystyrene skeleton and of which the functional group is a quaternary ammonium and having the $Cl^-$ anion as the counter-anion. Both columns are thermostatted at 70° C.

The third column (13) contains a macroporous anion resin DUOLITE A 172 with an acrylic skeleton having as its functional group a quaternary ammonium and the $OH^-$ anion as the counter-anion. This column is thermostatted at 50° C.

The extraction juice moves through the first cations column at a rate of 6 volumes of juice per volume of resin per hour and results in a juice with an optical density of 3.9 at 340 nm, a pH of 7.3 and a mineral content of 2.2 meq/l of $Cl^-$, 0.1 meq/l of $Ca^{++}$ and 6.4 meq/l of $SO_4^{--}$. Its gelling strength is 850 g/cm².

When the juice moves at the rate of 6 volumes of juice per volume of resin per hour through the second anion column, the resultant juice has an optical density of 0.7, a pH of 7.1 and a mineral content of 13 meq/l of $Cl^-$, 0.1 meq/l of $Ca^{++}$ and 0.9 meq/l of $SO_4^{--}$; its gelling strength is 850 g/cm².

The juice is cooled to a temperature of 50° C. By passing the extraction juice through the third anion column at a rate of 5 volumes of juice per volume of resin per hour, a juice is obtained which has an optical density of 0.4 at 3.40 nm, a pH of 8.8 and a mineral content of 0.5 meq/l of $Ca^{++}$ and 0.1 meq/l of $SO_4^{--}$; the gelling strength is 820 g/cm².

The recovered juice is congealed, then dried. Its yield in agar-agar is 19% by weight referred to the initial dry algae. This powder contains 0.1% $Cl^{--}$, 0.7% $Na^+$, 0.5% $SO_4^{--}$ and 70 ppm of $Ca^{++}$. The EDAX analysis shows the presence of traces of Si but no traces at all of heavy elements Fe, Mg, Pb, P, Al and Zn. The percentage of the total ash is 1.3%.

Galactose is present as 47% and anhydro-3,6-galactose as 49.5%. The gelling strength of the agar-agar produced at the end of the chain at a concentration of 1.5% is 730 g/cm². Its optical density is 0.2 at 340 nm. Its nitrogen concentration is 0.05%. The gelling strength is unchanged upstream and downstream of the ozone treatment. This treatment reduces the number of total germs per gram of agar-agar from 10,000 to 400.

We claim:

1. A process for making agar-agar from algae extraction juices, comprising combining in sequence the following steps:
    (a) placing the extraction juice in the presence of a cation ion exchange resin conditioned into the $Na^+$ form at a temperature exceeding the gelation threshold of said juice,
    (b) placing the extraction juice in the presence of an anion ion exchange resin conditioned into the $Cl^-$ and/or the $SO_4^{--}$ at a temperature exceeding the gelation threshold of said juice,
    (d) lowering the juice temperature below the gelation threshold, and
    (e) extracting the agar-agar from the obtained gel.

2. A process as in claim 1, and including a complementary operation (c) between the operations (b) and (d), comprising placing the extraction juice from operation (b) in the presence of an anion exchange resin conditioned into the $OH^-$ form at a temperature exceeding the gelation threshold of said juice.

3. A process as in claim 1, comprising placing the agar-agar in powder extract form in the course of an ulterior operation (f) in contact in a gas/solid phase with an ozone-loaded carrier gas.

4. A process as in claim 2, comprising carrying out the operation (f) by loading the carrier gas with ozone at a concentration of 2 to 20 mg of ozone per liter of carrier gas.

5. A process as claim 1 comprising maintaining the temperature of the extraction juice is kept between 60° and 80° C. during the course of the operation (a) and (b), and the operation (d) comprising cooling the juice to ambient temperature.

6. A process as in claim 2, comprising maintaining the temperature of the extraction juice between 50° and 60° C. during the complementary operation (c).

7. A process as in claim 1 and wherein the operation (a), the operation (b) and where called for the operation (c) comprise causing the extraction juice to percolate through thermostatted, fixed resin beds.

8. A process as in claim 1 and wherein the anion resin employed in operation (b) or where called for in operation (c) is a resin functionalized by quaternary ammonium groups.

9. A process as in claim 1 and wherein the cation resin used in operation (a) is a resin functionalized by sulfonic groups.

10. A process as in claim 8, and wherein the cation resin employed in operation (b) or wherein called for in operation (c) and the anion resin employed in operation (a) have an acrylic or polystyrene skeleton.

11. A process as in claim 9, and wherein the cation resin employed in operation (b) or wherein called for in operation (c) and the anion resin employed in operation (a) have an acrylic or polystyrene skeleton.

12. A process as in claim 1 and wherein the extraction (e) comprises pressing the gel through the filter in order to retain an agar-agar cake.

13. A process as in claim 11, and wherein the pressing operation (e) is performed through a filter at a pressure between 300 and 600 bars.

14. A process as in claim 1 and wherein the extraction (e) comprises congealing/decongealing the gel so as to precipitate the agar-agar.

* * * * *